United States Patent Office 3,725,112
Patented Apr. 3, 1973

3,725,112
NOVEL DISPLAY DEVICE
Lindsey B. Hansen, 2367 Porter Ave.,
Ogden, Utah 84401
Filed Dec. 4, 1970, Ser. No. 95,101
Int. Cl. B32b 33/00; G09f 7/00
U.S. Cl. 117—75                10 Claims

ABSTRACT OF THE DISCLOSURE

A novel display device comprising a substrate, a decorative surface on said substrate and a protective, low-gloss, uniformly textured, transparent, polymeric, organic coating adherent thereon and a process for making same has now been invented. Display devices, especially outdoor displays such as road signs, billboards, and the like are protected and made more readable by application of an adherent, transparent, polymeric organic coating which has a smooth, fine, uniform surface texture to provide a low-gloss finish. The display device is formed by applying to the decorative surface a resinous material which cures to a clear, transparent film having a fine uniformly textured surface. One manner of obtaining a clear, transparent, textured film comprises adding to a polymerizable organic material a component which initiates polymerization, continuing polymerization to attain a resinous mixture having a predetermined ratio of polymerized material to polymerizable material, applying the resinous mixture to a substrate having a decorative surface thereon to form a substantially continuous film of protective coating, and curing the resinous mixture to obtain a uniformly textured, transparent, polymeric, organic coating on said substrate.

BACKGROUND OF INVENTION

Display devices such as outdoor signs, traffic signs, advertising displays, billboards and the like are desirably protected with a transparent, weather-resistant coating. Transparent protective coatings suitable for outdoor use are generally hard and glossy. Application of such coating materials to outdoor signs yields a display device having a glossy surface. The gloss may be lowered or reduced by buffing. However, a non-uniform gloss usually results and the buffing leaves the surface with a multitude of small cuts or slices which tend to collect dirt upon outdoor exposure over a prolonged period. Furthermore, the buffing adds an additional step to the process of forming such low-gloss display devices. The extra buffing step is especially disadvantageous when the display device is a large billboard or other large object.

Pigmented opaque textured surface coatings are known in the art. Such coatings have been formed from tung oil resins. U.S. Pats. Nos. 1,976,191, 1,896,611, and 2,154,954 generally describe coatings of this type. Coatings of this type generally possess a coarse, textured surface which depends upon differential oxidation and polymerization of the film after it is applied to the substrate to obtain the textured surface.

INVENTION DESCRIPTION

A novel display device having a low-gloss coating thereon has now been invented. The display device comprises a substrate, a decorative surface on said substrate, and a protective low-gloss or substantially non-glare, uniformly textured, transparent, polymeric, organic coating adherent thereon. The display device is prepared by initiating polymerization of a liquid polymerizable coating material, continuing polymerization until a substantial portion of the material has polymerized, coating a decorative surface with the partially polymerized material to obtain a uniform textured, transparent surface after the coating has finally cured.

Further description of the invention may be facilitated by reference to the following figures.

ARTICLE DESCRIPTION

Figure 1:
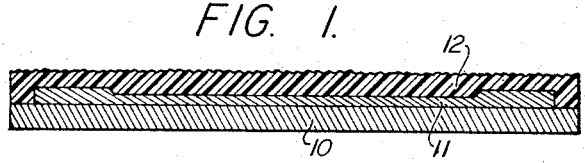
FIG. 1 is a cross-sectional view of a display device illustrating the substrate, a decorative layer and protective textured coating.

An embodiment of the display device of the instant invention is illustrated in cross-section in FIG. 1 wherein a substrate 10 is shown with decorative layer 11 adherent on the substrate and a protective, textured, transparent coating 12 adherent to the substrate and decorative layer. The substrate may be any convenient rigid material such as wood, steel, hardboard, aluminum and the like. The substrate is preferably weather resistant although as illustrated hereinafter in FIG. 3, the display device may be completely enveloped with a weather-resistant, protective, low-gloss coating. The decorative layer 11 may be a layer of paint, plastic film or colored paper or the like. For example, a printed paper display such as a map or a photograph or other decorative matter may be adhered to the substrate. The protective textured coating 12 adherent to the decorative layer and/or to the substrate protects the decorative layer and the substrate.

The protective coating is generally less than 0.10 millimeter in thickness and frequently less than about 0.50 millimeter (about 2 mils) and has a surface which is uniformly textured to produce a low-gloss or substantially non-glare finish. The texture of the protective coating is very fine and barely discernible to the naked eye. The effect of the texture, that is, low-gloss, is readily discernible visually and enhances the display inasmuch as the decorative layer is not obscured by reflections from the surface of the protective cotaing. Also, the fineness of the texture permits the decorative layer to be viewed through the transparent protective coating without perceptible distortion.

The textured surface may be described as a series of hills and valleys uniformly distributed across the surface. These minute hills and valleys cause reflected light to become diffused. The fineness or small size of the hills and valleys, however, does not substantially interfere with the transparency of the thin protective coatings. This is primarily true because the textured, non-glare coating is in contact with the objects which are viewed therethrough. Although the surface is uneven, that is, possesses hills and valleys, the surface is nevertheless smooth with no sharp or rough edges.

Figure 2:
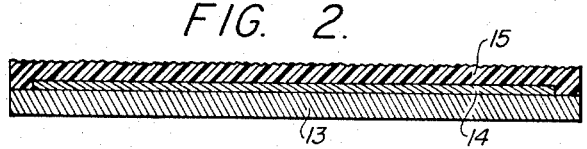
FIG. 2 is a cross-sectional view of another display device showing the substrate, a decal on said substrate and a protective textured coating.

In FIG. 2 another embodiment is illustrated wherein a substrate 13 has a decal 14 positioned on its surface and a coating 15 of a protective, transparent, textured polymeric organic coating adherent to the decal and substrate. The decal may be a plastic or paper film or sheet having fanciful or informative coloring or printing thereon.

Figure 3:
FIG. 3 is a display device wherein the whole device is enveloped with a textured protective coating.

FIG. 3 illustrates another embodiment wherein a substrate 16 has a coating 17 thereon and the whole combination is enveloped within a protective textured coating 18.

Figure 4:
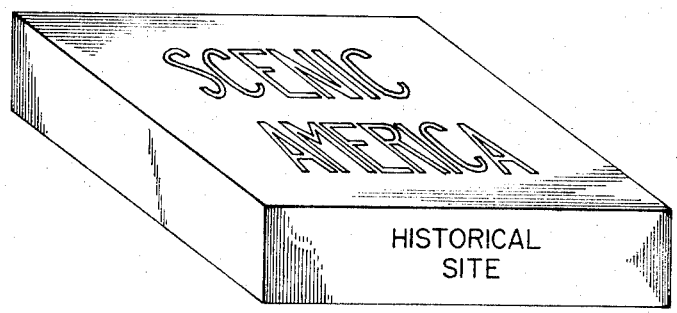
FIG. 4 is a perspective view of a three-dimensional display device.

FIG. 4 illustrates a three dimensional display device wherein a textured, low-gloss, protective, organic coating is adherent thereon and renders the display weather resistant and easily readable.

Although etched glass provides a good low-gloss or non-reflective surface the use of glass in many outdoor locations such as in public parks or on roadside signs and the like presents a severe breakage problem. Furthermore, a protective, low-gloss, transparent, organic coating is light in weight and may be readily applied at an outdoor location to very large displays such as large billboards or the like. Although the finely textured organic coating has a multitude of depressions and humps there are no rough or sharp edges such as exist in buffed organic coating surfaces. Also, the display devices of this invention may have figures, numbers or other objects slightly raised on the surface of the display which would preclude effective buffing to obtain a non-reflective surface.

Epoxy coatings have been found especially useful as the protective coating although other thermosetting resinous materials such as unsaturated polyesters and polyurethanes have been found useful. It is preferred, however, that the resinous material possess a low concentration of chromophoric groups. Also, thermoplastic materials such as polymethyl methacrylate, polyvinyl chloride and the like are useful although these surfaces are not as resistant to abrasion and yellowing as the epoxy coatings.

PROCESS DESCRIPTION

The novel display devices of this invention are made by forming a decorative coating or surface on an appropriate substrate and applying to the substrate a polymeric, organic coating material which cures to a clear, transparent film having a fine, uniformly textured surface. A preferred method of providing a clear, transparent textured coating comprises applying a polymeric organic coating material which has previously been partially polymerized to provide, upon final curing, an article having a low-gloss, textured, transparent, polymeric organic coating adherent to the decorative surface and substrate. The partially polymerized organic coating material is obtained by adding to the polymerizable organic coating material a component which initiates polymerization and continuing polymerization until a portion of the polymerizable material is polymerized and applying the mixture of polymerizable material and partially polymerizable material to the substrate and decorative layer. The polymerizable organic material includes monomers, dimers, and cross-linkable polymeric materials. For example, if a coating of polymethacrylate is to be obtained the polymerizable material can be methylmethacrylate to which a catalyst such as benzoyl peroxide is added to initiate polymerization. After conducting polymerization until a predetermined ratio of polymerized material to polymerizable material is obtained the coating material is then applied to the substrate. It has been found generally, that permitting about 10 percent to about 20 percent of the polymerizable material to become polymerized achieves the desired results when the coating material is applied to the substrate. The polymerized material is uniformly distributed throughout the resinous liquid before application and is, therefore, uniformly distributed throughout the coating after it is applied. The polymerized material, upon application to the substrate, forms minute lumps in substantially uniform concentration across the surface of the article. After the remaining polymerizable material polymerizes a film or coating is obtained having a smooth textured finish.

The component which initiates polymerization may be a catalyst or initiator, or a monomeric or polymeric material which actually participates in the reaction. For example, a two component epoxy resin is defined for the purpose of this invention as having a polymerizable organic component which may be a polyepoxide and a component which initiates polymerization, which component may be an amine or a reactive component such as an anhydride or acid such as carbocylic acid groups pendant from a polyester chain. Also, if polyester resins are utilized as the coating material the polymerizable organic material can be an unsaturated polyester resin while the component which initiates polymerization comprises an unsaturated monomer such as styrene or the like.

The protective coating material may be applied to a portion or the whole surface of the substrate or entirely envelop the whole display. The application techniques include spraying, flow coating and dipping. Spraying is generally a preferred technique and it is generally preferred that the coating be diluted with at least a small quantity of solvent to aid in spraying.

The process of this invention is preferably employed to produce a substantially colorless or clear transparent film. Also, it is preferred that the film is substantially homogeneous which, for the purpose of this invention, defines a film which has no polymeric material other than polymeric material formed from the reactants of the coating material. Textured films can be formed by additions of polymers foreign to the polymerizable material. Upon curing of a film from such a heterogeneous mixture an interface would exit between the foreign polymers and the polymerized coating material which would tend to cause opalescence, thereby diminishing the clarity of the film.

Although the display device of this invention may be cured at elevated temperatures it is preferred to utilize organic coating materials which cure at substantially room temperature. This is especially desirable whenever the display devices are large outdoor signs which are coated in situ.

A road-side display was prepared by painting a metal sheet with a pigmented epoxy paint to provide a background. A sign was then lettered with contrasting colored epoxy paint and permitted to dry. A protective coating of clear, low-gloss epoxy paint was then applied to the sign to form a weather-resistant display having a low-glare surface. The protective epoxy coating applied to the display device was prepared from a commercially available oxirane polyester coating system of the two-component type. One component contained about sixty percent by weight of oxirane modified esters while the other component contained about 50 percent by weight of polyester resin. The oxirane modified ester component had about seven percent aromatic hydrocarbon and the remainder of glycol ether esters. The polyester resin component had about 30 percent aromatic hydrocarbons and about 20 percent glycol ether esters. The polyester resin also contained a benzotriazole derivative. The pot life of the components after being mixed was approximately 15 hours.

The two components were thoroughly admixed and permitted to stand for about two hours. After curing the device was examined. The coating had a low-luster or low-glare surface which was clear, transparent and through which the decorative portions of the display were easily viewed. The texture of the surface was barely discernible to the naked eye.

Similar results are achieved when two component polyester systems comprising an unsaturated polyester resin and alpha-beta ethylenically unsaturated monomers such as styrene are utilized as the separate components. A catalyst such as benzoyl peroxide, methyl ethyl ketone peroxide, cumene hydroperoxide and the like is utilized to initiate polymerization. The polyester components are generally applied in a solvent system.

The exact degree of polymerization required to obtain the desired effect may be readily determined by mixing two small samples of the component together and applying to a surface after a period of time has passed. If, after curing, the surface coating has insufficient light-diffusing or non-glare properties then a second sample of the two components are admixed and permitted to polymerize for a longer period of time. As indicated hereinabove, it has been found that the desired degree of polymerization is between about five percent and about thirty percent of the polymerizable materials present and preferably between about ten and twenty percent.

Two component polyurethane systems are useful in this invention wherein a polyisocyanate such as tolyl diisocyanate is utilized as one component and a polyether polyol or polyester polyol is utilized as the other component in the presence of a catalyst. The polyurethane and polyester coatings are generally slightly less resistant to coloring by ultraviolet light than clear epoxy resins.

Although the invention has been described hereinabove with reference to specific embodiments it is to be understood that it is not to be limited solely thereto but to include all the variations and modifications falling within the scope of the appended claims.

What is claimed is:
1. A display device comprising:
   (a) a substrate;
   (b) a resinous pigmented background coating adherent to and covering said substrate;
   (c) a decorative layer adherent on said background coating; and
   (d) a substantially distortion-free, adhering, protective, very finely textured, transparent, polymeric, epoxy outer-coating having a non-glare surface covering the entire display surface.
2. The display device of claim 1 wherein the decorative layer is substantially resistant to deterioration by the protective coating.
3. The display device of claim 1 wherein the protective coating wholly envelops the display device.
4. The display device of claim 1 wherein a decorative layer exists on two or more surfaces of said substrate.
5. The display device of claim 1 wherein said decorative layer comprises a decorative plastic film.
6. The display device of claim 5 wherein the decorative plastic film is a colored plastic film.
7. The display device of claim 6 wherein the plastic film is a background for information.
8. The display device of claim 1 wherein the protective coating is a homogeneous coating.
9. The display device of claim 1 wherein the substrate is a metal substrate.
10. The display device of claim 1 wherein the substrate is flat.

References Cited
UNITED STATES PATENTS

| | | | |
|---|---|---|---|
| 3,389,013 | 6/1968 | Armitage et al. | 117—75 X |
| 2,984,030 | 5/1961 | Hannon | 161—408 X |
| 3,287,193 | 11/1966 | Klein | 161—18 X |
| 3,415,670 | 12/1968 | McDonald | 117—76 P X |
| 3,493,414 | 2/1970 | Hastings | 117—161 ZB X |
| 3,468,704 | 9/1969 | Graver | 117—161 ZB |
| 3,271,183 | 9/1966 | Varlet | 117—72 X |
| 3,287,155 | 11/1966 | Munn | 117—161 UB X |
| 3,467,060 | 9/1969 | Klebanow et al. | 117—161 ZB |

RALPH HUSACK, Primary Examiner

U.S. Cl. X.R.

40—135; 117—12, 45, 72, 159; 161—3.5, 18, 408, 413